(12) United States Patent
Goergen et al.

(10) Patent No.: US 9,958,622 B1
(45) Date of Patent: May 1, 2018

(54) PORT AND CABLE CONNECTION LABELING USING OPTICAL ELEMENTS

(71) Applicant: CISCO TECHNOLOGY, INC., San Jose, CA (US)

(72) Inventors: Joel Richard Goergen, Soulsbyville, CA (US); Robert Gregory Twiss, Chapel Hill, NC (US); Charles Calvin Byers, Wheaton, IL (US); Chad M. Jones, Doylestown, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/424,498

(22) Filed: Feb. 3, 2017

(51) Int. Cl.
    *G02B 6/38*     (2006.01)
    *G08B 5/36*     (2006.01)
    *G02B 6/42*     (2006.01)

(52) U.S. Cl.
    CPC ......... *G02B 6/3895* (2013.01); *G02B 6/3893* (2013.01); *G02B 6/428* (2013.01); *G02B 6/4213* (2013.01); *G02B 6/4215* (2013.01); *G02B 6/4293* (2013.01); *G08B 5/36* (2013.01)

(58) Field of Classification Search
    CPC .......................... H01R 13/7175; H01R 13/641; H01R 12/515; H01R 13/6641; H01R 13/6691; H01R 13/717; H01R 2201/06; H01R 9/24; G01R 19/165; G01R 13/00; G01R 19/16595; G02B 6/4292; A61B 1/00124; A61B 1/00126
See application file for complete search history.

(56) References Cited

U.S. PATENT DOCUMENTS

| | | | |
|---|---|---|---|
| 4,978,317 A | 12/1990 | Pocrass | |
| 7,019,658 B1 * | 3/2006 | Erickson | H01R 13/641 340/635 |
| 8,769,172 B2 * | 7/2014 | Soffer | G06F 3/023 710/62 |
| 9,357,902 B2 * | 6/2016 | Amling | A61B 1/00119 |
| 9,619,979 B1 * | 4/2017 | Montero | H01R 13/641 |
| 2003/0125606 A1 * | 7/2003 | Amling | A61B 1/00119 600/109 |
| 2008/0113522 A1 * | 5/2008 | Wagner | H01R 13/5213 439/35 |
| 2009/0109050 A1 * | 4/2009 | Sullivan | H04L 43/00 340/691.1 |
| 2009/0109700 A1 | 4/2009 | Yi et al. | |

(Continued)

FOREIGN PATENT DOCUMENTS

EP      1641087      3/2006

*Primary Examiner* — Fekadeselassie Girma
(74) *Attorney, Agent, or Firm* — Cindy Kaplan

(57) ABSTRACT

In one embodiment, a method includes receiving light from a light generating device at a port of a network device, the port comprising a port optical element positioned within a path of the light, receiving a cable assembly comprising a plug at the port, the plug comprising a plug optical element positioned for alignment with the port optical element when the cable assembly is coupled with the port, and processing the light at the port optical element and the plug optical element. The processed light is emitted from a portion of the plug extending from the port when the cable assembly is coupled with the port to provide a visual indication of compatibility between the cable assembly and the port. An apparatus is also disclosed herein.

20 Claims, 8 Drawing Sheets

(56) References Cited

U.S. PATENT DOCUMENTS

| | | | |
|---|---|---|---|
| 2009/0274422 A1 | 11/2009 | Henry et al. | |
| 2010/0227493 A1 | 9/2010 | Guy et al. | |
| 2011/0104942 A1 | 5/2011 | Karam | |
| 2013/0076521 A1* | 3/2013 | Hsu | H02J 7/0047 340/664 |
| 2014/0210631 A1* | 7/2014 | Zavis | G01R 5/28 340/815.45 |
| 2014/0347189 A1* | 11/2014 | Weksler | H04M 1/72563 340/687 |
| 2015/0235119 A1* | 8/2015 | Colman | G06K 19/06046 235/454 |
| 2015/0377947 A1* | 12/2015 | Hai | G01R 19/2506 324/750.01 |
| 2016/0055725 A1* | 2/2016 | Kreiner | G01R 19/165 340/657 |
| 2017/0220444 A1* | 8/2017 | Montero | G06F 11/2635 |
| 2017/0228328 A1* | 8/2017 | Armstrong | G06F 13/1673 |

* cited by examiner

PORT AND CABLE CONNECTION LABELING USING OPTICAL ELEMENTS

TECHNICAL FIELD

The present disclosure relates generally to communications connection labeling, and more particularly, to providing an indication of port and cable compatibility.

BACKGROUND

It is often desirable to have information about the status or capabilities of wired communications ports. Due to the increasing density of linecards, there may be inadequate space available for traditional labels. In communications ports that also have the capability of supplying electric power (such as Power over Ethernet—PoE), it is often important to identify situations where the cables are incapable of safely carrying the voltage or current levels supplied by the port, which could create an electrical or fire hazard. This problem is complicated when ports are software programmable to support multiple power levels.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1A:
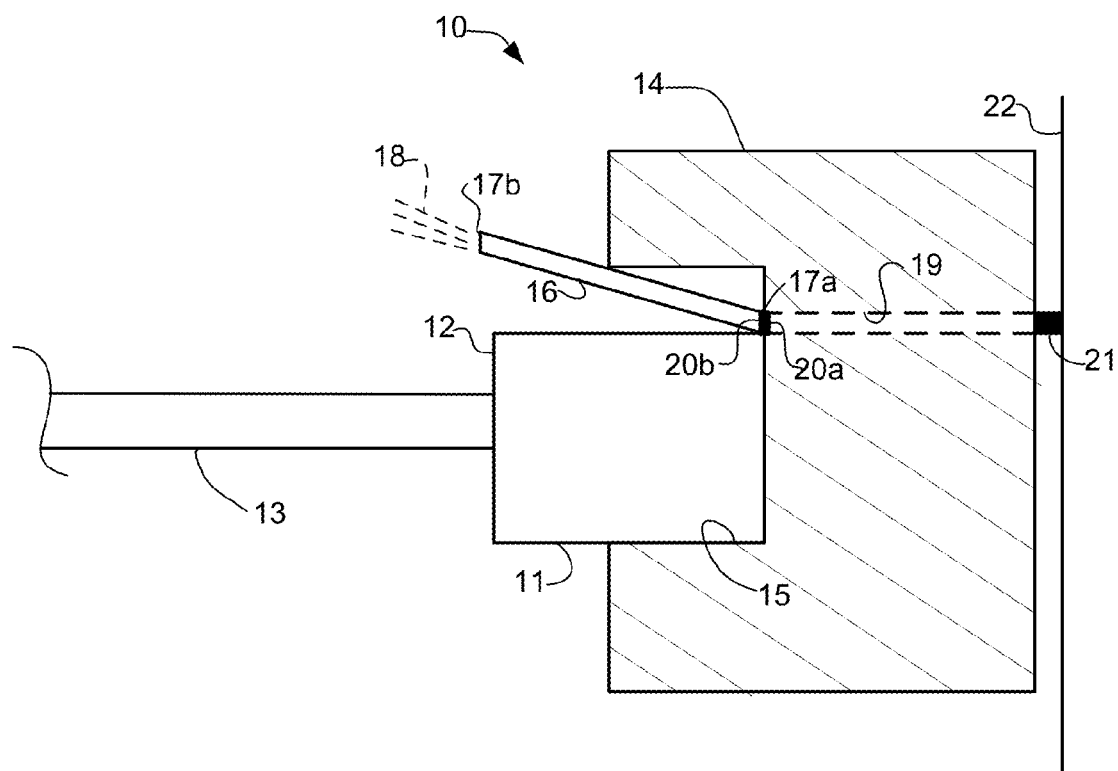
FIG. 1A is a schematic of a port and cable connection, in accordance with one embodiment.

In one embodiment, a method generally comprises receiving light from a light generating device at a port of a network device, the port comprising a port optical element positioned within a path of the light, receiving a cable assembly comprising a plug at the port, the plug comprising a plug optical element positioned for alignment with the port optical element when the cable assembly is coupled with the port, and processing the light at the port optical element and the plug optical element. The processed light is emitted from a portion of the plug extending from the port when the cable assembly is coupled with the port to provide a visual indication of compatibility between the cable assembly and the port.

In another embodiment, an apparatus generally comprises a port configured for operation at a network device in a power over communications cable system and configured to receive a cable assembly operable to transmit power and data when coupled to the port, a port optical element positioned within the port to align with a plug optical element of the cable assembly when the cable assembly is coupled to the port, and a light pipe extending through the port for transmitting light from a light generating device to the port optical element. The port optical element is configured to process the light and emit the light onto the plug optical element to provide an indication of compatibility between the cable assembly and the port based on a power setting of the port and a power capacity of the cable assembly, when the cable assembly is coupled to the port.

In yet another embodiment, an apparatus generally comprises a plug comprising a cable end having a cable inserted therein and a free end for insertion into a port, the cable configured to transmit data and power when coupled to the port and comprising a specified power capacity, and an optical element located on the free end of the plug and configured to process light received from the port based on the specified power capacity of the cable when the plug is inserted into the port, wherein light processed by the optical element is emitted from the plug to provide a visual indication of compatibility between the cable and the port based on a power setting of the port and the power capacity of the cable when the plug is inserted into the port.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Power over Ethernet (PoE) is one example of a power over communications cable system that is used to pass electric power along with data to allow a single cable to provide both data connectivity and electric power to network devices such as wireless access points, IP (Internet Protocol) cameras, VoIP (Voice over IP) phones, video cameras, point-of-sale devices, security access control devices, residential devices, building automation, industrial automation, and many other devices.

With equipment utilizing ports capable of providing both energy and data connectivity, it is often critical to include adequate labeling. Due to the increasing density of port devices (e.g., linecards), there is often inadequate space available on a faceplate for conventional labels. Even more complexity is introduced when ports have programmable power outputs (e.g., programmable PoE), some of which may extend beyond the capacity of standard Ethernet cables (e.g., greater than 60 Watts). Unless the power carrying capability of the cable is adequate for the programmed output capacity of the specific port it is plugged into, the wiring may overheat and create a fire hazard.

This situation is aggravated by new versions of standards or regulations that require individual, per-port labels for the energy delivery capabilities of each PoE port. For example, the 2017 NEC (National Electrical Code) requirement for power over communications cable includes a new section 725.121(C) that requires the maximum current and voltage output for each connection to be labeled. Labeling of the output connections will permit the installer to have ready access to the power levels at the point of connection at the equipment.

In addition to the labeling requirements described above, UL (Underwriters Laboratories) and the NEC have introduced other challenges for the deployment of PoE sources and devices. For example, the 2017 NEC discusses several limitations on communications circuits with Class II and Class III power circuits, as well as Limited Power Circuits that may confuse installers and electricians with various amperage limitations, limit longevity of building infrastructure to equipment installed at the time, and restrict equipment design by limiting power source types.

Furthermore, there is a possibility that future code versions may require a port labeling system. If traditional labels are used on equipment, it may be necessary to reduce the port density of linecards to free up enough front panel space to provide readable per-port labels. However, this would impact equipment capability and reduce network scalability. Also, cable tags are generally undesirable for network communications cable installations since tags may be sucked into an airflow system, interfere with cable bundling, and cable markings are often difficult to see.

There is currently no clearly defined system that allows power sources and powered devices using communications cables to be interconnected in a clear and well-behaved manner. For these reasons, it is desirable to provide a useable and cost effective solution to these approaching problems in the telecommunications sector.

The embodiments described herein provide labeling for port and cable connections through visual indication of port and cable compatibility. Power compatibility labeling may be provided for port and cables capable of delivering power and data connectivity (e.g., PoE systems). In one or more embodiments, optical elements may be integrated into port and plug connectors, with light emitted through a port processed by the optical elements at an interface between the port and plug, and emitted as a visible indicator through a rear portion (e.g., retention tab) of the plug connector. As described in detail below, one or more implementations may be used to generate a light (e.g., red light) from the plug connector to indicate that a dangerous combination of port power setting and cable capacity is being used, and a different color (e.g., green light) when safe combinations of port power and cable capacity are used. The use of optical elements to indicate conformance between the power and the cable make the solution ideal for intrinsically safe systems where a spark or thermal effect must be incapable of causing combustion.

Referring now to the drawings, and first to FIG. 1A, an example of a communications connection (coupling, connector assembly), generally indicated at 10, is shown. The connection 10 may be used for connecting communications equipment through cables configured to carry both data and power, for example. Signals may be exchanged among communications equipment and power transmitted from power sourcing equipment to powered devices. In one or more embodiments, the connection 10 may be used in a PoE, USB, or other power over communications cable systems.

As shown schematically in the example of FIG. 1A, the connection 10 is formed from a cable assembly 12 (also referred to as a plug, cable, or male connector) and a port 14 (also referred to as a jack, receptacle, receiver, or female connector) coupled together. The cable assembly 12 comprises a plug (connector) 11 and a cable 13 extending from one end of the plug for transmitting data and power. The port 14 comprises a receptacle (cavity, opening) 15 formed in a body of the port for receiving a free end of the plug 11. The cable assembly 12 further includes a resilient tab 16 configured to rest against an inner surface of the body of the port 14 to lock the plug in place. As shown in FIG. 1A, the tab 16 extends rearwardly from the port 14 and is thus viewable upon insertion of the plug 11 into the port.

The port 14 may be configured to delivery power at one or more output levels (e.g., programmable PoE). The cable assembly 12 may be rated for one or more power levels, a maximum power level, or identified according to one or more categories indicating acceptable power level usage, for example. As described in detail below, one or more embodiments may provide labeling using a visual indication of power compatibility (e.g., safe/unsafe or compatibility level) between the coupled cable assembly 12 and port 14.

The port 14 may be mounted onto a board (e.g., printed circuit board) 22 using any suitable connection means. The board includes one or more light generating devices 21 (e.g., Light Emitting Diode (LED) or other light source that may produce light of a programmable color). The port 14 comprises one or more light pipes 19 configured such that one end of the light pipe is positioned adjacent to the light generating device 21 when the port is mounted on the board 22. The light generating device 21 (along with light pipes) may also be integrated into the port 14.

Light is emitted from the light generating device 21 at one end of the light pipe 19 and transmitted through the port 14 and onto one or more optical elements 20a, 20b positioned at an interface of the port and plug 11 when the plug is inserted into the port. The optical elements 20a, 20b may comprise one or more optical elements located in the port 14 and plug 11. The optical element 20a may be in communication with one or more light pipes 19 for transmitting light from one or more light generating devices 21 at the printed circuit board 22 to the optical element. The light pipe 19 collects light from the light generating device 21 and redirects the light to the optical element 20a in the port so that the light is emitted from the optical element 20a located in the cavity 15 of the port and is visible from a front side of the port. The light emitted from the port 14 indicates a power output for the port, thus providing a label for the port.

As noted above, the plug 11 may include a tab (latch) 16 on an exterior surface thereof for securing the cable assembly 12 within the receptacle (socket) 15. The tab 16 may be depressed to eject the plug 11 from the port 14. As shown in FIG. 1A, the tab 16 comprises a proximal end 17a generally adjacent to the free end of the plug 11 and a distal end 17b extending rearwardly out from the port 14 when the plug is inserted into the receptacle 15. As described in detail below, one or more embodiments utilize the distal end 17b of the tab 16 to emit light 18 to provide a visual indication of compatibility of the port and cable connection 10. In one embodiment, a plastic material of the tab 16 operates as a light pipe to carry light to a location in which a technician can easily view the light 18 as it leaves the tab.

As described further below, the optical elements 20a, 20b may be mounted on the port 14 and plug 11 and configured to process the light transmitted from the light generating device 21 to create color illumination at the distal end 17b of tab 16 and visually indicate whether the cable assembly 12 is compatible with the power setting of the port 14. The combinations of port optical elements 20a and plug optical elements 20b determine if light paths are open or blocked, in accordance with the indication states the system is to convey.

The technician may, for example, refer to a legend on the equipment or remotely located in a manual, to determine the capabilities of each port and if the correct cable is in use based on the port power setting. For example, a green light may indicate that the port and cable combination is acceptable. A red light may indicate that there is a mismatch between power setting at the port and cable capability. A yellow light may indicate that the compatibility is unknown (e.g., legacy cable, failure in one of the optical components) or a cable mismatch that is not a hazard (e.g., low power output port and high power cable).

The term 'compatibility' (or phrase 'indication of compatibility') as used herein may refer to states in which the cable assembly 12 and port 14 are either compatible or not compatible (e.g., safe/unsafe) or may refer to levels of compatibility.

Figure 1B:
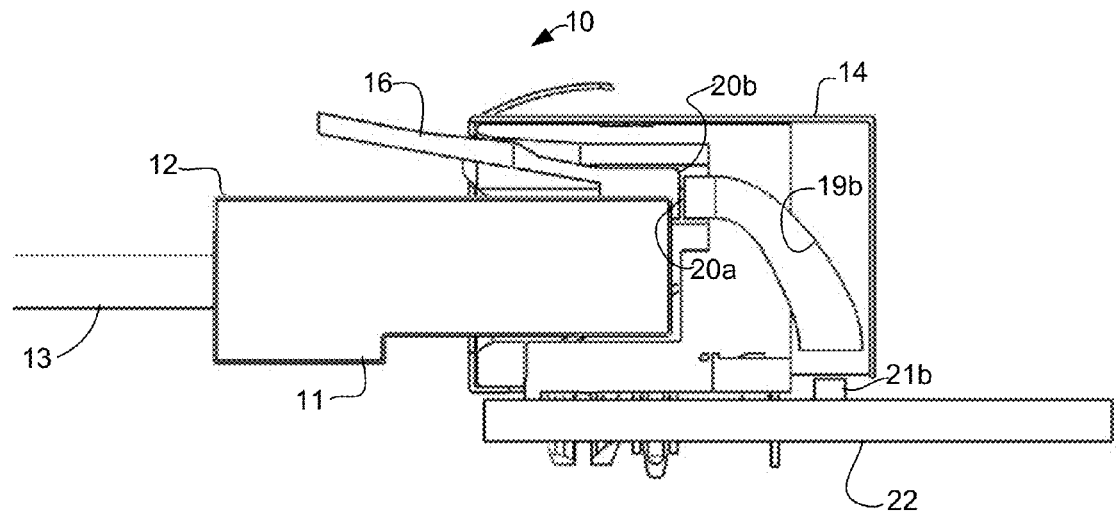
FIG. 1B is a partial cross-sectional view of the port and cable connection, in accordance with one embodiment.
Figure 1C:
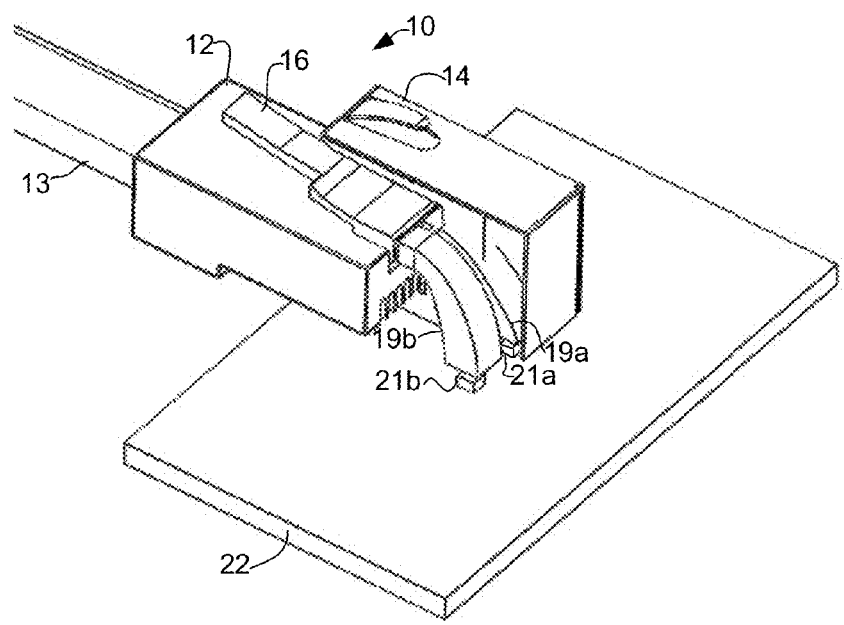
FIG. 1C is a perspective of the port and cable connection shown in FIG. 1B.

FIGS. 1B and 1C show a partial cross-sectional side view and perspective view, respectively, of the coupled cable assembly 12 and port 14, in accordance with one embodiment. In the example shown in FIG. 1C, a pair of curved light pipes 19a, 19b extends through an elongated portion of a shroud to direct light from surface mount light generating devices 21a, 21b onto the mating plug interface. The tab 16 includes an enlarged planar surface for mounting of the optical element 20b. It is to be understood that this is only an example and that the connection 10 may include any number of light generating devices, light pipes, or optical elements on the port 14 or plug 11

FIGS. 1A, 1B, and 1C illustrate simplified views of a single port and plug connection 10. It is to be understood that the port assembly 14 may comprise any number of receptacles 15 for receiving any number of cable assemblies 12. For example, the port assembly 14 may be integral with a faceplate, panel, housing, or linecard comprising any number of receptacles (e.g., 96 or any other number) for receiving any number of cable assemblies 12. Some receptacles may support arrays of multiple ports side-by-side, or layers of ports stacked one on top of the other. Different light pipe arrangements will carry the light from the array of light generating devices to the optical elements in the ports. The panel may be located on any type of network device (e.g., switch, backplane, router, server, gateway, hub, computer, etc.). Additional details of the cable assembly 12 are shown in FIGS. 2A and 2B and details of the port 14 are shown in FIGS. 3A, 3B, and 3C, and described below.

Figure 2A:
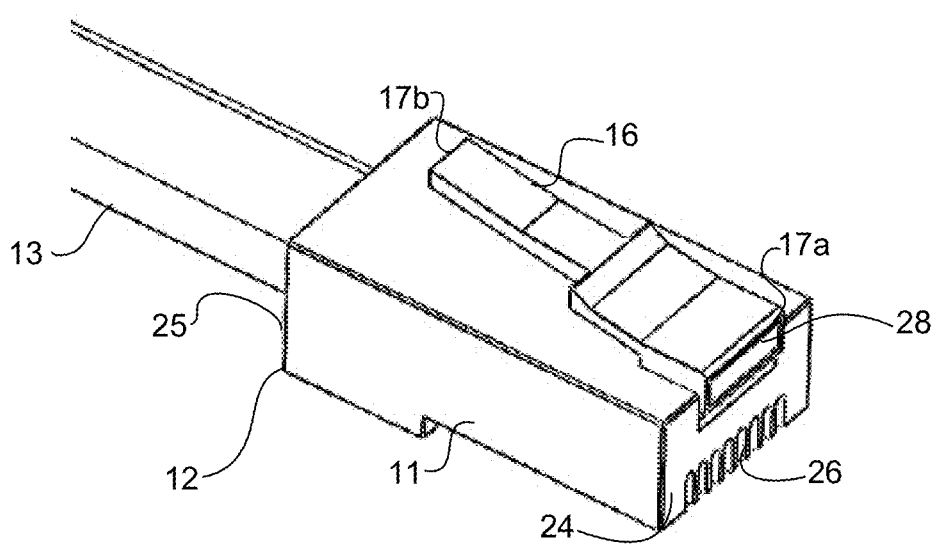
FIG. 2A is a perspective of a cable assembly of the port and cable connection shown in FIG. 1B.
Figure 2B:
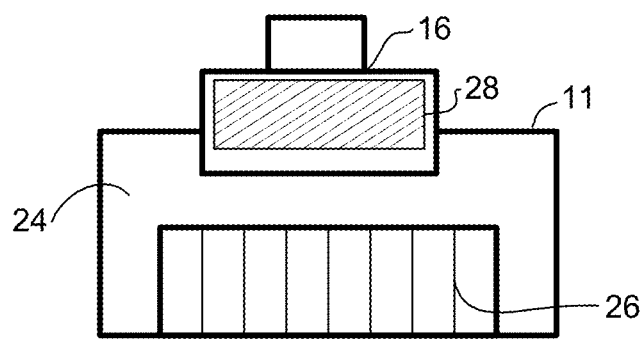
FIG. 2B is a schematic front view of the cable assembly shown in FIG. 2A.
Figure 3A:
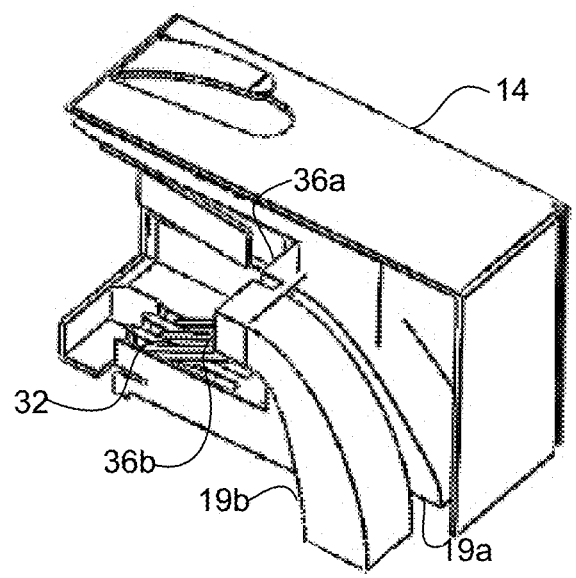
FIG. 3A is partial cross-sectional perspective of a port of the port and cable connection shown in FIG. 1B.
Figure 3B:
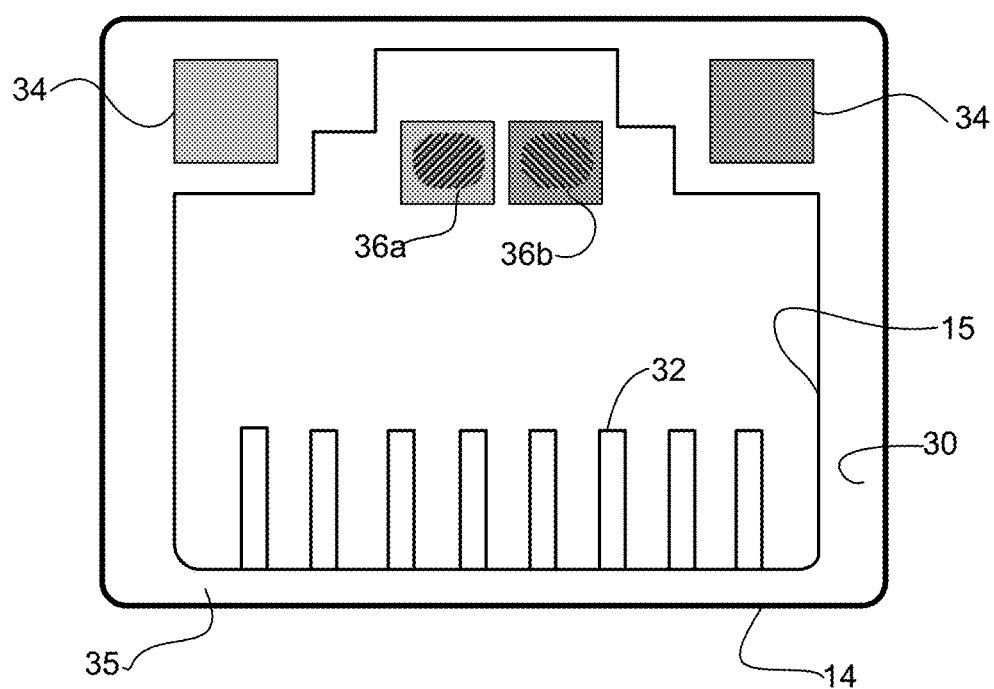
FIG. 3B is a schematic front view of the port shown in FIG. 3A.
Figure 3C:
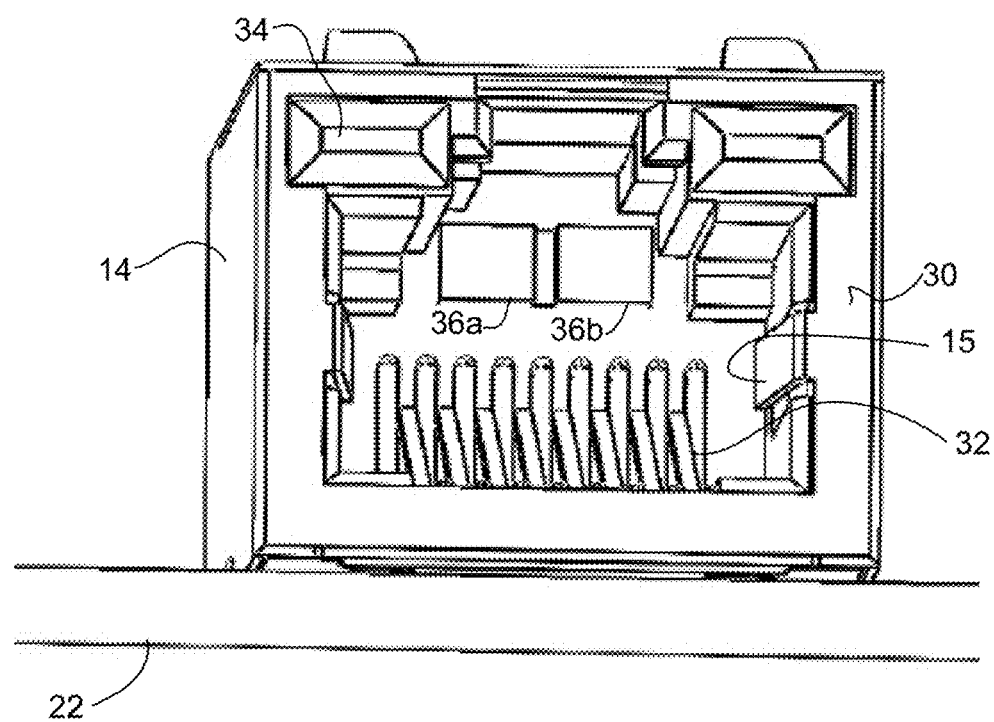
FIG. 3C is a perspective of the port shown in FIG. 3A.

Referring now to FIGS. 2A and 2B, a perspective and front view, respectively, of the cable assembly shown in FIGS. 1B and 1C are shown, in accordance with one embodiment. As described above, the cable assembly 12 comprises a plug 11 and cable 13. The plug 11 includes an insulating body supporting an array of conductive contacts 26, which are connected to corresponding conductors of the multi-conductor cable 13. The example shown in FIG. 2A comprises eight conductive contacts (pins) 26 (e.g., RJ-45 connector), however, it is to be understood that this is only an example and the plug 11 may include any number or type of contacts.

The plug 11 includes a free end 24 for insertion into opening 15 in the port 14 (FIGS. 1A and 2A), a cable input end 25 having a cavity for receiving the multi-conductor cord 13, and a resilient locking tab 16 integrally connected by a flexible hinge to the free end of the plug and extending obliquely rearward therefrom. The tab 16 extends from a body of the plug in a flexible hinged manner and is shown in a relaxed position in FIG. 2A. The tab 16 may be integrally molded with the plug 11 or attached thereto and have various configurations (size, width, cross-section, shape, etc.).

As previously described, a shaft of the tab 16 may operate as a light pipe. The tab 16 may be formed, for example, from a clear or semi-transparent material that allows light to pass therethrough (e.g., via internal diffusion or other process) so that it is easily viewable by a technician. For example, the light pipe may be formed of natural colored polycarbonate, clear polycarbonate, clear acrylic, or any other suitable material. In addition, the resin may be pigmented to provide translucency that alters or otherwise enhances the processed light emitted by the light generating device. In one or more embodiments, the distal end 17b of the tab may be treated to emit the light in a way that is easy for a technician to see when the cable assembly 12 is inserted into the port 14. The tab 16 may comprise a boot (e.g., plastic or rubber cover), in which case a notch (e.g., cut, slot) may be made in the boot to allow the light to be emitted therethrough. Alternatively, the boot may be molded out of a transparent or translucent elastomer.

It is to be understood that the tab 16 shown in FIG. 2A is only an example and the term 'tab' as used herein may refer to any device, member, element, component, or structure connected to the plug 11 (e.g., integrally formed therewith or attached thereto) that visibly extends from the port 14 when the plug is inserted into the port or configured such that light emitted from the plug is visible when the plug is inserted into the port. In one or more embodiments the tab may perform another function such as a plug retention means.

As shown in the example of FIGS. 2A and 2B, an optical element 28 is positioned near a 'nose' (proximal end) 17a of the tab 16 (generally adjacent to the free end 24 of the plug). The plug optical element 28 comprises a rectangular element containing an optical processing structure (e.g., filter, baffle, polarizer, as described further below). The optical element 28 may be rectangular, round, oval, or any other suitable geometric shape and may comprise one or more elements that correspond to the optical elements located on the port 14.

FIGS. 3A, 3B, and 3C illustrate the port assembly (jack, receiver) 14, in accordance with one embodiment. FIG. 3A is a partial cross-sectional perspective of the port 14 illustrating the conductor contacts 32, and light pipes 19a, 19b. The light pipes 19a, 19b may comprise, for example, a clear plastic path that conveys light from one location to another. In one embodiment, the light pipe 19a, 19b is simply a hollow passageway that extends through the port 14 and allows light from the circuit board to diffuse to optical elements 36a, 36b. One end of the light pipe 19a, 19b is positioned adjacent to the light generating device to enable conveyance of light from the light generating device to the other end on which the optical element 36a, 36b is located. The light pipe 19a, 19b may have a cross-section that is rectangular, oval, circular, or any other geometry, and may be straight, angled, or curved.

FIG. 3B is a schematic front view of the port assembly shown in FIG. 3A. FIG. 3C is a perspective showing the receptacle 15 and internal components. The receptacle 15 is formed in a front wall 30 of the port 14 and configured to receive the mating plug 11. The port 14 includes an insulating body 35 supporting the corresponding array of conductors 32. In this example, the port 14 includes eight conductor contacts 32 and may also include port status LEDs 34 (e.g., amber and green port status lights) along with other structures to accept the plug 11 (including the tab 16), and retain the cable. A back-end portion of the conductors 32 extends outside the body 35 for attachment to conductors of a separate cable or printed circuit board 22 (FIG. 1B).

The port 14 includes optical elements 36a, 36b located on a rear face of the receptacle 15 and positioned to mate with the optical element 28 on the plug. As shown in FIG. 3C, an area inside the receptacle 15, where the nose of the plug 12 abuts, comprises the optical elements 36a, 36b. In one embodiment, the optical element comprises two rectangular elements having complementary polarization (FIG. 3B). The optical elements 36a, 36b may be bonded or co-molded to the output of the light pipes 19a, 19b, for example. As previously described with respect to FIG. 1C, the optical elements 36a, 36b are illuminated by the light generating devices 21a, 21b on the linecard's circuit board 22. The cross-hatched structures shown in FIG. 3B indicates optical processing elements 36a, 36b configured to manipulate the light before it is coupled into the nose of the plug 11 and operable to work in conjunction with the optical processing element 28 on the plug (FIGS. 2B and 3B).

It is to be understood that the port and plug connection 10 shown in FIGS. 1A, 1B, and 1C, cable assembly 12 shown in FIGS. 2A and 2B, and the port 14 shown in FIGS. 3A, 3B, and 3C, and described herein are only examples and that other port, plug, cable, or connector configurations, including those covered by different standards or codes, may be used without departing from the scope of the embodiments. For example, the cable assembly 12 shown in FIGS. 2A and 2B and the port 14 shown in FIGS. 3A, 3B, and 3C illustrate eight pin, eight conductor connectors, however, the embodiments described herein may be used with other types of connectors having a fewer or greater number of pins, conductors, or signal pairs, and different types of contacts. The port and mating plug may have any cross-sectional shape (e.g., rectangular, round, etc.).

The embodiments may be used with various types of connectors used within the telecommunications industry, such as registered jacks RJ-45 type connectors, or any other type of connectors such as USB (Universal Serial Bus) connectors, and the like used in the telecommunications industry, computer industry, automotive industry, or other industries. The embodiments may be applicable to any intrinsically safe system.

Also, it is to be understood that the use of the latching tab 16 to transmit the light 18 (FIG. 1A) is only one example and that different elements either attached to the plug or integrally formed therewith may be used to direct the light to a location viewable by a technician when the plug 11 and port 14 are coupled together. Furthermore, it is to be understood that PoE is just one example of a system that is capable of delivering energy along with data connectivity and that the embodiments described herein may be used in any type of power over communications cable system or communications system.

In one or more embodiments, the cable assembly 12 may also include one or more visible or tactile features that also communicate power-level capacity to aid proper cable selection before the plug 11 is inserted into the port 14. For example, the plug 11 may include one or two curved notches on the side or outer rim of the plug indicating a power capacity of the cable assembly.

As previously described, the mating surfaces of the connectors 12, 14 have complementary sets of optical elements (20a, 20b in FIGS. 1A, 1B, and 1C, 28 on cable assembly 12 in FIGS. 2A and 2B, and 36a, 36b on port 14 in FIGS. 3A, 3B, and 3C). In one embodiment, an optical circuit is formed between the light generating devices 21a, 21b on the circuit board 22 that emit light, light pipes 19a, 19b that deliver the light to a rear face of the receptacle 15, back-to-back optical processing elements that manipulate the light as it is emitted from the end of the light pipes and coupled into the plug 11, and the light pipe formed by the shaft of the plug's tab 16, and the emission surface on the end of the tab that the technician views. In one embodiment, the combinations of port optical elements 20a and plug optical elements 20b determine if light paths are open or blocked, in accordance with the indication states the system is to convey. The following describes examples of optical processing elements that may be used to manipulate the light and indicate compatibility of a connected cable and port.

In one embodiment, the optical processing elements comprise polarizers that may be bonded to or precision molded with plastic components forming the plug 11 and port 14. One example of a process that may be used to integrate the polarizing elements onto the components is an In-Mold Decoration (IMD) technique in which a thin polarizing film is co-molded into the plastic component. IMD co-molding may allow very precise film/part alignment in high-volume manufacturing.

Standard directions of polarization may be used in the receptacle of the ports 14. For example, one optical element (or light pipe end) may be polarized 45 degrees to the right, and the other optical element polarized 45 degrees to the left. Complementary polarizations may be molded into the nose of the plug in such a way that they identify the type of cable in use. For example, if the plug's optical element 28 is molded with a polarization that is 45 degrees left (e.g., for low power cable), one of the port's light pipe's optical elements 36a is molded with a polarization that is 45 degrees to the left, and the other port light pipe's optical element 36b is molded with its optical element polarized 45 degrees to the right, then only light from the port with the left polarization (36a) that matches the plug's polarization direction will exit the tab and be visible. In this way, the selection of the polarization direction of the plug polarizer 28 can select which of the two alternate light outputs will be visible. Furthermore, the linecard's software may program the color output of the light emitting devices, for example, with red light associated with the left polarizer output and green light associated with the right polarizer output for high power output ports. In this example, the system will pass red light from one of the port light pipes of a high power output port, and block a green light, making the tip of the tab 16 glow red for a low power cable. Conversely, if the polarization on the nose of the plug is 45 degrees right (e.g., for a high power cable), the red light would be substantially blocked and the green light would pass. The plug polarizations may be standardized and coordinated with port polarizations to denote the power capacity of the cable (e.g., left for less than 60 Watts and right for more than 60 Watts, or any other configuration), thus eliminating the need for conventional port labeling.

In one example, the light generating devices (e.g., LEDs) 21a, 21b driving the two light pipes 19a, 19b may be programmable in color. For example, if a port 14 is reprogrammed from 30 Watts to 100 Watts, the colors displayed for the two polarizations may be reversed in the receptacle, thus reversing the light the technician would see. This may, for example, allow all situations in which the cable type matches the output capacity programmed into the port to display green light on the tab, and mismatches to show red light. Depending upon the combinations of the optical processing elements, and the two LED colors, many states and combinations may be displayed on the tab 16 when the plug 11 is inserted into the port 14. In situations where no plug is installed in a port 14, the color of the light pipes 19a, 19b would be visible, thereby informing the technician what output power level is currently programmed on that port.

Another embodiment may utilize color rather than polarization to select light paths. In one example, LEDs 21a, 21b may be programmed to specific primary colors or any other colors (e.g., green blue, red). The optical processing element 28 on the plug's nose (FIG. 2A) may comprise color filters designed to be either transparent or opaque to certain of those wavelengths. Depending upon the combinations of LED colors illuminating the filters, different colors or combinations of colors will pass to the tab 16 and out to the technician when the plug 11 is inserted into the port 14 (FIG. 1B). Different combinations of filters may be used for different ratings of cables 13. Technicians may then be trained or refer to a legend on the equipment or other location that indicates which colors are normal, and which colors represent abnormal or dangerous conditions.

Another embodiment may utilize a plug optical element 28 that blocks one or both of the incoming light streams from the port 14. In one example, either the left or right side of the tab's nose 17a may be occluded by paint or metallization, depending upon if the plug is designated as a low or high power cable (FIG. 2A). The light generating devices 21a, 21b driving the port source lights may be programmed, for example, to drive red light out the path that is open if a hazardous combination of port power and cable capacity exists, and pass green light otherwise (FIG. 1C). In addition to using programmable light colors, various flash patterns may also be implemented (which would be passed and blocked by the optical elements the same way colors are) to support technicians with color blindness.

A further enhancement to any of the above embodiments may be to use one of the light pipes 19a, 19b in the port 14 to carry light out towards the tab 16 through the optical processing elements 20a, 20b that provide the keying combination, and use the other light pipe as a light return (e.g., landing on a photocell (not shown) on the linecard's printed circuit board 22) (FIGS. 1B and 1C). Internal reflections within the shaft and end of the plug's tab may be configured to provide adequate return illumination. This return path will only pass light if the correct combination of optical processing elements exists, thereby giving the system an automatic way to verify that the correct type of cables are installed for the programmed port power levels. In this case, there is no need for a technician to check compatibility and an alarm or signal may be generated if the cable 13 is not compatible with the port 14.

Figure 4:
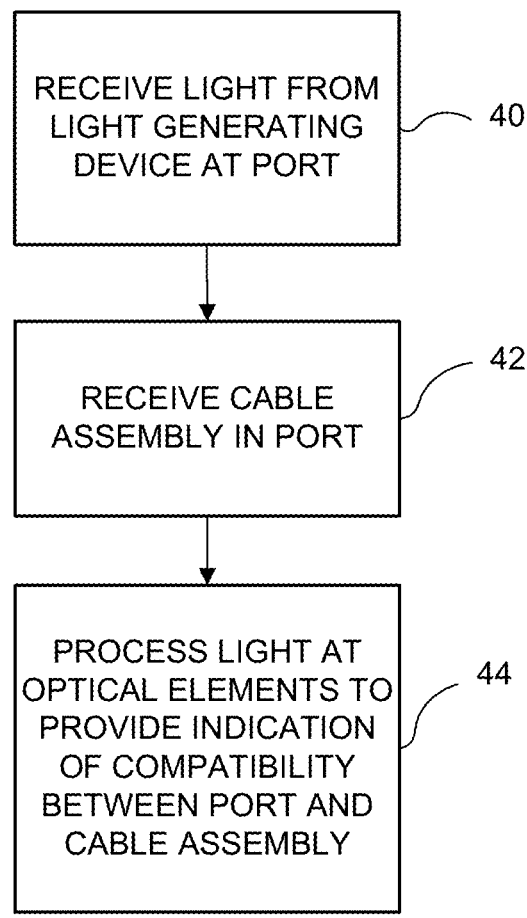
FIG. 4 is a flowchart illustrating an overview of a process for indicating compatibility of the port and cable connection, in accordance with one embodiment.

FIG. 4 is a flowchart illustrating an overview of a process for visually indicating compatibility of the cable assembly 12 and port 14, in accordance with one embodiment. At step 40, light is received from the light generating device 21 via the port 14 (FIGS. 1A and 4). The cable assembly 12 is inserted into the receptacle 15 of the port 14 (step 42). Light emitted from the light generating device 21 is processed at the optical elements (e.g., port optical elements 36a, 36b (FIG. 3B), plug optical element 28 (FIG. 2B)) to provide a visual indication of compatibility (e.g., level of compatibility) between the cable assembly 12 and the port 14 (step 44). A technician viewing the emitted light may take appropriate action if a hazard or abnormal condition is indicated.

It is to be understood that the flowchart shown in FIG. 4 and described above is only an example and that steps may be added, combined, or modified, without departing from the scope of the embodiments.

Figure 5:
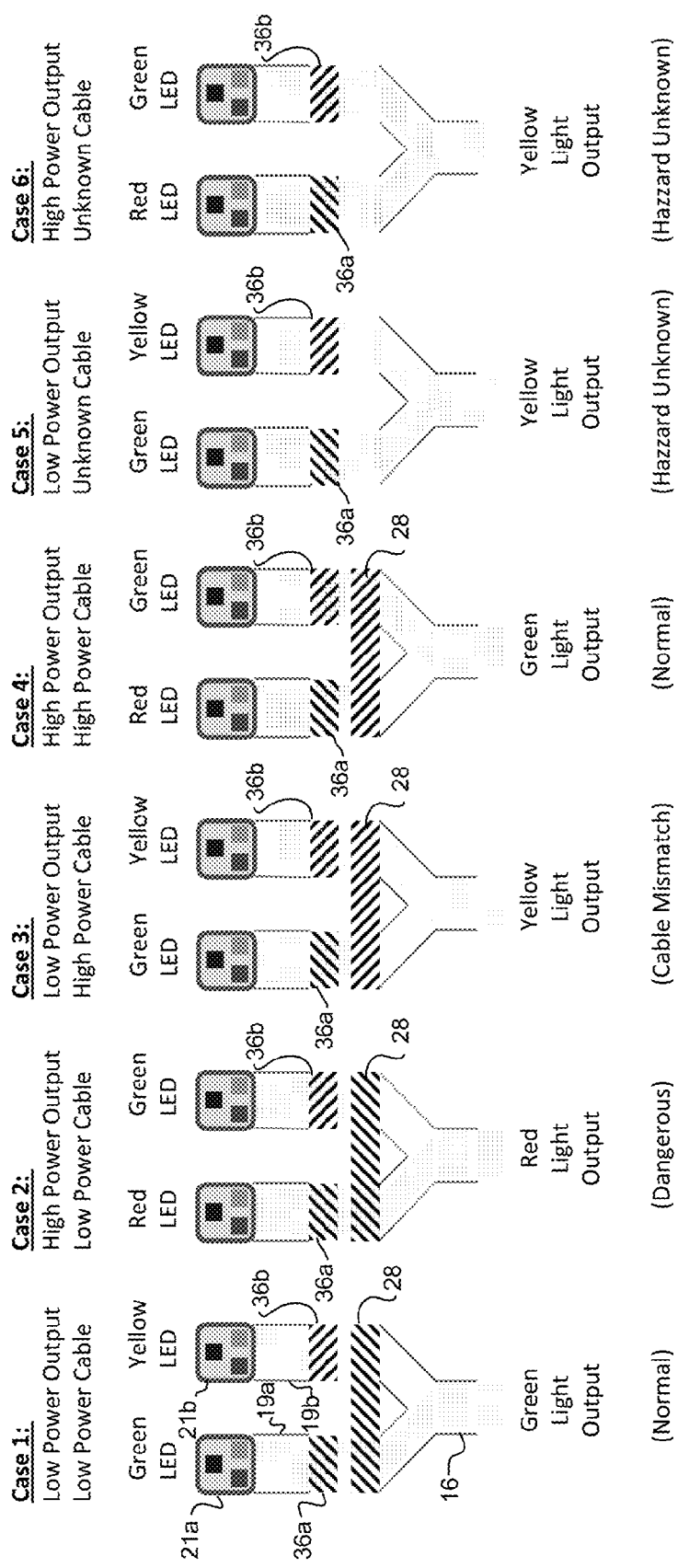
FIG. 5 is a diagram illustrating power compatibility indications for various port and cable connections, in accordance with one embodiment.

FIG. 5 is a state diagram illustrating power compatibility indications for various port and cable connections, in accordance with one embodiment. Different light colors emitted from the tab 16 of the plug 11 when the cable assembly 12 is inserted into the port 14 may indicate different configurations or compatibility issues with the connector assembly according to a visual indication provided by the optical elements.

The example shown in FIG. 5 includes six different combinations of port power output and cable power capacity (Case 1, Case 2, Case 3, Case 4, Case 5, and Case 6). Each case indicates the color of the light generated at the light generating devices 21a, 21b in communication with port optical elements 36a, 36b via light pipes 19a, 19b in the port 14. In these examples, the light generating devices 21a, 21b are programmable color LEDs that feed into the light pipes 19a, 19b in the port 14. The port 14 includes two port optical elements 36a, 36b positioned at ends of the light pipes 19a, 19b opposite the LEDs 21a, 21b. The port 14 is coupled with the plug 11, which includes optical element 28. The port optical elements 36a, 36b and plug (cable assembly) optical element 28 are aligned with one another so that light passing through the port optical elements 36a, 36b is emitted onto the plug optical element 28. In this example, the optical elements 28, 36a, 36b comprise polarizers.

As shown in FIG. 5, the port polarizers 36a, 36b are orthogonal to one another in the two light paths. The plug polarizer 28 resolves light received from the port optical elements 36a, 36b. Optical paths that include two polarizers with parallel orientations pass light, while optical paths where the polarizer directions are orthogonal will block light. The light pipe in the plug (e.g., tab 16) combines optical paths and mixes colors received from the two light paths so that the output state color is visible at the distal end 17b of the tab 16 (FIGS. 2A and 5).

In this example, the LEDs 21a, 21b are programmed (as viewed in FIG. 5) left green/right yellow for low power ports and left red/right green for high power ports. Yellow light can be made by simultaneously energizing the red and green LED chips in the light generating devices. The port polarizer 36a is angled left on the left LED (as viewed in FIG. 5) and the port polarizer 36b is angled right on the right LED. The plug polarizer 28 is angled left for low power cable assemblies and right for high power cable assemblies. A pair of polarizers that are oriented parallel to one another will pass light (e.g., Case 1, left port polarizer 36a and plug polarizer 28). A pair of polarizers that are oriented perpendicular to one another will block light (e.g., Case 1, right port polarizer 36b and plug polarizer 28. As described below with respect to Cases 5 and 6, legacy plugs/cables (e.g., cable assemblies with no polarizers) mix light received from both port light pipes 19a, 19b and processed at the port optical elements 36a, 36b.

Referring first to the example shown in Case 1, a low power output port is coupled with a low power cable assembly. The LEDs 21a, 21b are programmed left green and right yellow for a low power output port as previously described. In this example, the port is coupled with a cable assembly configured for low power operation. The green light from the LED 21a passes through port optical element 36a and is transmitted through the plug polarizer 28, which is oriented parallel to the port polarizer. The plug polarizer 28 is oriented perpendicular to the right port polarizer 36b and therefore blocks the yellow light emitted from the yellow LED. The green light is emitted from the end of the tab 16 on the plug 11 via the light pipe formed by the tab such that the technician will see a green light when the plug is inserted into the port, thus indicating that the cable and port assemblies are compatible (normal condition).

Referring now to Case 2, a high power output port is coupled with a low power cable assembly. The LEDs 21a, 21b for the high power output port are programmed to emit red light for the left LED and green light for the right LED (as viewed in FIG. 5). The low power cable assembly includes a polarizer 28 that is parallel to the optical element 36a in the path of the red LED and thus transmits the red light. The plug polarizer 28 is orthogonal to the polarizer 36b in the path of the green LED and thus blocks the green light. The red light is output from the back of the plug via the tab 16 when the plug is inserted into the port, thereby indicating to the technician that this is an unsafe (dangerous) combination.

Case 3 illustrates a low power output port coupled with a high power cable assembly. This is not an unsafe condition, however, it is not the best use of resources since the high power cable can instead be used for a high power port. However, if this port is also capable of switching to a high power output, the technician may want this configuration. The plug polarizer 28 for the high power cable assembly is parallel with the right port polarizer 36b, as shown in FIG. 5. Thus, the yellow light is output from the plug indicating a cable mismatch (but not red, which would indicate a hazardous condition).

Referring now to Case 4, a high power output port is mated with a high power capable cable assembly. The green light processed by the right port polarizer 36b passes through the plug polarizer 28, thus providing a green light output and indicating a compatible combination (normal condition).

In Case 5, a conventional (legacy) cable assembly with no optical element 28 is inserted into a low power output port. In this case, the green and yellow light mix and a yellow (or yellow-green) light is output from the plug indicating to the technician that the hazard is unknown.

Referring now to Case 6, a conventional (legacy) cable assembly with no optical element is inserted into a high power output port. The red and green lights pass through the port optical filters 36a, 36b, respectively and mix to form a yellow output, indicating to the technician that the hazard is unknown.

It is to be understood that the programmed LEDs, color combinations, optical element configurations, visual indications, and compatibility outcomes shown in FIG. 5 are only examples and that other configurations of optical elements or light combinations may be used to provide the same or different visual indication of power compatibility. For example, the port assembly 14 may include only one light generating device and one optical element for interfacing with one optical element on the cable assembly 12. In this example, a red light may be emitted from the optical element only for a high power output port 14 and the polarizer on the plug 12 may be configured to pass the red light if the cable is a low power cable or block the red light if the cable is a high power cable. The technician would therefore only see a red light if the cable was not compatible with the power setting on the port (dangerous condition) or a legacy cable was used. If the correct cable was used with the high power port, no light would pass through the plug optical element. Many other combinations of lights, colors, optical elements, or indications (visual or non-visual (e.g., alarm)) may be used without departing from the scope of the embodiments.

Also, it is to be understood that the embodiments described herein may be configured to provide compatibility information other than power compatibility. For example, the embodiments may be used with connectors such as HDMI (High-Definition Multimedia Interface), DVI (Digital Visual Interface), DisplayPort, Thunderbolt, etc. to indicate compatibility between cables and ports for the display of different video formats. Another example in which the embodiments described herein may be utilized is for matching cable to port output currents for USB connectors. The embodiments may be used to provide a visual indication of any type of compatibility for various types of connectors, cables, plugs, and ports.

The embodiments described herein may operate in the context of a data communication network including multiple network devices. As described above, the network may be configured for PoE. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Figure 6:
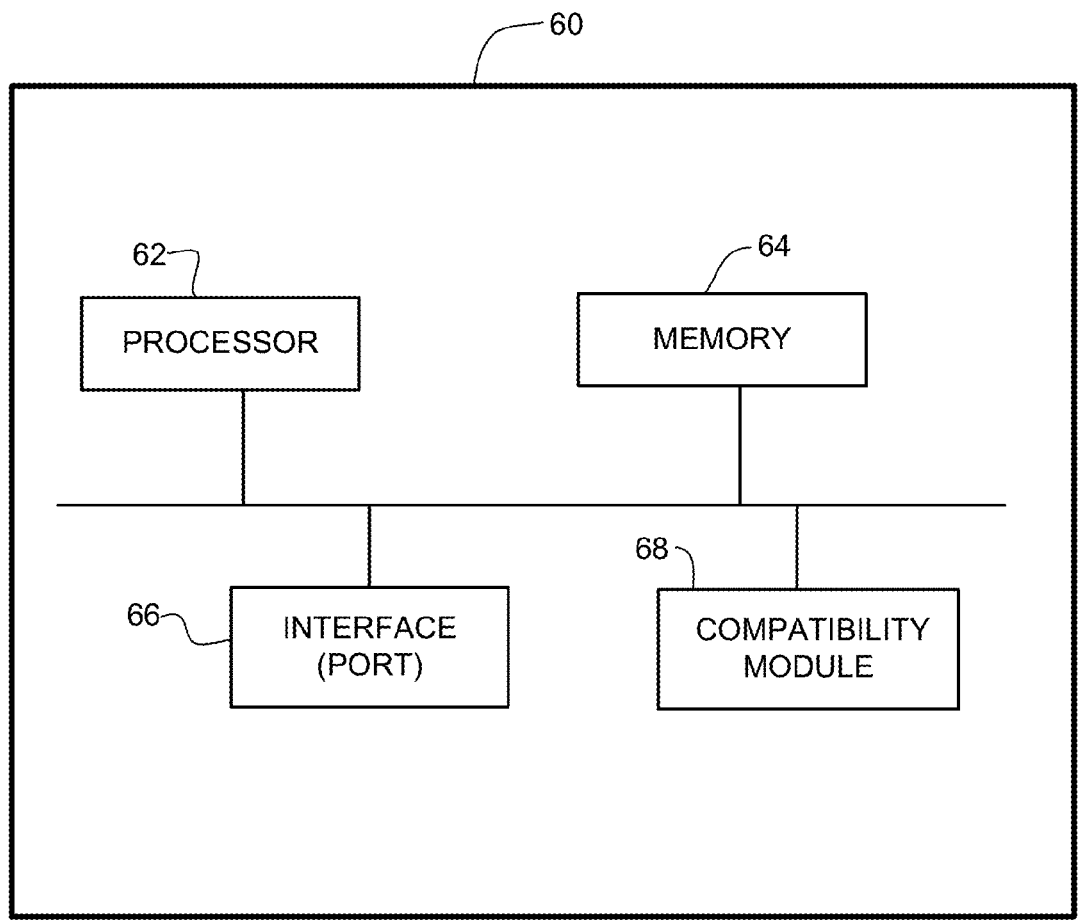
FIG. 6 is a block diagram depicting an example of a network device on which the port may be located.

FIG. 6 illustrates an example of a network device 60 that may be used to implement the embodiments described herein. In one embodiment, the network device 60 is a programmable machine that may be implemented in hardware, software, or any combination thereof. The network device 60 includes one or more processor 62, memory 64, network interface (port) 66, and compatibility module 68.

Memory 64 may be a volatile memory or non-volatile storage, which stores various applications, operating systems, modules, and data for execution and use by the processor 62. For example, components of the compatibility module 68 (e.g., code, logic, firmware, etc.) may be stored in the memory 64. The network device 60 may include any number of memory components.

Logic may be encoded in one or more tangible media for execution by the processor 62. For example, the processor 62 may execute codes stored in a computer-readable medium such as memory 64. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described above with respect to the flowchart of FIG. 4. The network device 60 may include any number of processors 62.

The network interface 66 may comprise any number of interfaces (linecards, ports) for receiving data or transmitting data to other devices. The network interface 66 may include, for example, an Ethernet interface for connection to a computer or network. As described above, the interface 66 may comprise one or more receptacles configured to receive one or more plugs and may be configured for PoE or similar operation. Interface ports 66 may also include circuitry needed to inject power into the output ports, and illuminate the light generating devices associated with each port with the selected color.

The compatibility module 68 may be configured, for example, to program the light generating devices 21a, 21b based on power output at the port 66 and modify the light output (e.g., turn on or off one or more LEDs, change color output) based on changes to power settings. In one or more embodiments, the module 68 may be configured to process light reflected back to the linecard and set an alarm if a dangerous combination of port power output and cable assembly exists, as previously described. An alarm condition may also initiate system logging messaging. Compatibility module may also be configured to blink LEDs in recognizable patterns to accommodate viewing by color blind technicians.

It is to be understood that the network device 60 shown in FIG. 6 and described above is only an example and that different configurations of network devices may be used. For example, the network device 60 may further include any suitable combination of hardware, software, algorithms, processors, devices, components, or elements operable to facilitate the capabilities described herein.

As can be observed from the foregoing, the embodiments described herein may provide numerous advantages. For example, one or more embodiments provide a way to color code the power capacity of PoE ports on a high density network device (e.g., switch, linecard) without sacrificing faceplate space. Red/green status indication may be provided to insure that cable current carrying capacity is adequate to carry the power delivered by a specific port. This may help to eliminate fire hazards on high power PoE systems. Network devices having PoE ports with programmable output powers may reprogram the LED color that illuminates the plug in one or more embodiments. Cables using the embodiments described herein may interoperate with legacy ports and ports using the embodiments may interoperate with legacy cables (although some of the indication and alarm features may not be available). Also, the embodiments may allow equipment to comply with new power labeling code requirements and reduce technician error.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving light from a light generating device at a port of a network device, the port comprising a port optical element positioned within a path of the light;
receiving a cable assembly comprising a plug at the port, the plug comprising a plug optical element positioned for alignment with the port optical element when the cable assembly is coupled with the port; and
processing the light at the port optical element and the plug optical element, wherein the processed light indicates whether the cable assembly is in conformance with a power output at the port of the network device;
wherein the processed light is emitted externally from a portion of the plug extending from the port when the cable assembly is coupled with the port to provide a visual indication of compatibility between the cable assembly and the port.

2. The method of claim 1 wherein the visual indication of compatibility is based on a power output at the port and a power rating of the cable assembly.

3. The method of claim 2 further comprising changing the power output at the port and a color of the light emitted from the light generating device.

4. The method of claim 1 wherein the plug optical element is located on a proximal end of a tab configured to retain the plug within the port and wherein the light is emitted from a distal end of the tab extending from the port when the cable assembly is coupled with the port, the tab forming a light pipe for transmitting the light from the proximal end of the tab to the distal end of the tab.

5. The method of claim 1 wherein the light generating device comprises a light emitting diode mounted on a circuit board and in communication with the port optical element via a light pipe formed in the port.

6. The method of claim 1 wherein the optical elements comprise one or more filters.

7. The method of claim 1 wherein the optical elements comprise one or more polarizing elements.

8. The method of claim 1 wherein at least one of the optical elements is configured to block the light.

9. An apparatus comprising:
a port configured for operation at a network device in a power over communications cable system, and configured to receive a cable assembly operable to transmit power and data when coupled to the port;
a port optical element positioned within the port to align with a plug optical element of the cable assembly when the cable assembly is coupled to the port; and
a light pipe extending through the port for transmitting light from a light generating device to the port optical element;
wherein the port optical element is configured to process the light and emit the light onto the plug optical element to provide an indication of compatibility between the cable assembly and the port based on a power setting of the port and a power capacity of the cable assembly, when the cable assembly is coupled to the port.

10. The apparatus of claim 9 further comprising a processor for selecting a color of the light for transmission from the light generating device based on the power setting of the port and selecting a different color when the power setting changes at the port.

11. The apparatus of claim 9 wherein the port optical element comprises two optical elements comprising complementary polarization.

12. The apparatus of claim 9 further comprising a light path formed in the port and configured to return the light processed by the plug optical element to a circuit board connected to the port for processing to provide said indication of compatibility.

13. The apparatus of claim 9 wherein the light processed by the plug optical element is emitted from the cable assembly and wherein said indication of compatibility comprises a visual indication of compatibility based on a color of the light emitted from the cable assembly.

14. The apparatus of claim 9 wherein the apparatus comprises a plurality of ports mounted on a circuit board.

15. An apparatus comprising:
a plug comprising a cable end having a cable inserted therein and a free end for insertion into a port;
the cable configured to transmit data and power when coupled to the port and comprising a specified power capacity; and an optical element located on said free end of the plug and configured to process light received from the port based on said specified power capacity of the cable when the plug is inserted into the port;

wherein the light processed by the optical element is emitted from the plug to provide a visual indication of compatibility between the cable and the port based on a power setting of the port and said power capacity of the cable when the plug is inserted into the port.

16. The apparatus of claim 15 further comprising a tab connected to the plug and configured to extend from the port when the plug is inserted into the port, and wherein the optical element is located at a proximal end of the tab located generally adjacent to said free end of the plug, and a distal end of the tab is configured to emit the light.

17. The apparatus of claim 15 wherein the optical element comprises a polarizer configured for alignment with a port optical element, the light passing through the port optical element and onto the optical element of the plug when the plug is inserted into the port.

18. The apparatus of claim 15 wherein the optical element comprises different configurations for a low power cable and a high power cable.

19. The apparatus of claim 15 wherein a color of the light emitted from the tab indicates a level of said compatibility.

20. The apparatus of claim 15 wherein the optical element is positioned to align with two port optical elements when the plug is inserted into the port, each of the port optical elements comprising a polarizer, wherein the combination of the port optical elements and the optical element in the plug determine a color of the light emitted from the tab.

* * * * *